US006329464B1

(12) United States Patent
Duran et al.

(10) Patent No.: US 6,329,464 B1
(45) Date of Patent: Dec. 11, 2001

(54) FLEXIBLE THERMOPLASTIC POLYOLEFIN COMPOSITIONS

(75) Inventors: Juan-Antonio Garcia Duran, Geneva (CH); Loic Pierre Rolland, Divonne-les-Bains (FR)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/403,334

(22) PCT Filed: Apr. 21, 1998

(86) PCT No.: PCT/US98/08319

§ 371 Date: Oct. 19, 1999

§ 102(e) Date: Oct. 19, 1999

(87) PCT Pub. No.: WO98/47958

PCT Pub. Date: Oct. 29, 1998

(30) Foreign Application Priority Data

Apr. 23, 1997 (EP) .................................................. 97201191

(51) Int. Cl.[7] ........................................................ C08L 81/00
(52) U.S. Cl. .............................. 525/190; 525/64; 525/85; 525/185; 525/222

(58) Field of Search ................................ 525/64, 85, 185, 525/190, 222

(56) References Cited

U.S. PATENT DOCUMENTS

| 5,159,006 | 10/1992 | Breant .................................. 524/436 |
| 5,362,533 | * 11/1994 | Fukuda . |
| 5,395,881 | * 3/1995 | Spelthann . |

FOREIGN PATENT DOCUMENTS

| 0 703 271 A1 | 3/1996 | (EP) . |
| 61 176 637 A | 8/1986 | (JP) . |
| 203149 | * 9/1986 | (JP) . |
| WO 89/06256 | 7/1989 | (WO) . |
| WO 93/19118 | 9/1993 | (WO) . |
| WO 94/04610 | 3/1994 | (WO) . |

* cited by examiner

Primary Examiner—David J. Buttner

(57) ABSTRACT

Halogen-free thermoplastic blends of a polar rubber, ethylene vinyl acetate and a polyolefin are provided which are flexible and are particularly useful in replacing polyvinyl chloride for production of various products.

4 Claims, No Drawings

FLEXIBLE THERMOPLASTIC POLYOLEFIN COMPOSITIONS

BACKGROUND OF THE INVENTION

1. Field of Invention

This invention relates to polyolefin compositions and more particularly to such compositions which are flexible and to shaped articles made from them.

2. Background Discussion

Polyvinyl chloride (PVC) products have been on the market for many years and are commonly used in a large variety of applications. With the trend toward a chlorine-free environment, there is in some market segments such as construction, automotive and wires and cables industries a need for an alternative to PVC. Ethylene-propylene-diamine-methylene EPDM) rubbers are alternatives, but tend to be costly.

WO 93/19118 and WO 89/06256 disclose PVC-free compositions that are suitable for use as coatings for electrical cables. These compositions contain several components that are similar to those described, but lack, i.a, the terpolymer described in the present application.

EP 0 703 271 A1 discloses flexible, halogen-free thermoplastic polyolefin compositions, including certain which are based upon ethylene vinyl acetate, ethylene vinyl acetate carbon monoxide and very low density polyethylene. While these compositions are useful in many applications, they have been found to soften or melt unacceptably under certain high temperature applications.

SUMMARY OF THE INVENTION

According to the present invention there is provided a flexible, halogen-free polymer composition which comprises a blend of:
(1) a polar rubber selected from the group consisting of (a) ethylene vinyl acetate carbon monoxide terpolymer containing 30–90% by weight ethylene, 10–70% by weight vinyl acetate and 1–20% by weight carbon monoxide, (b) acrylonitrile butadiene rubber, (c) acrylate acrylonitrile styrene rubber and (d) ethylene n-butylacrylate carbon monoxide terpolymer containing 30–90% by weight ethylene, 10–70% by weight n-butylacrylate and 1–20% by weight carbon monoxide;
(2) ethylene vinyl acetate containing 30–90% by weight ethylene and 10–70% by weight vinyl acetate; and
(3) a polyolefin selected from the group consisting of (a) linear low density polyethylene having a specific gravity greater than 0.925, (b) low density polyethylene having a specific gravity greater than 0.920, (c) high density polyethylene, (d) polypropylene homopolymer and (e) ethylene-polypropylene copolymer.

It is to be understood that more than one type of polar rubber, ethylene vinyl acetate and/or polyolefin can be used together in the present invention.

Polymer blends according to the present invention have been found to have, in addition to the advantages of halogen-free blends, surprisingly high heat stability. High heat stability is an important characteristic for certain end-uses of the blends, including, in the automotive field, for sun visors, trunk covers, door panels, dashboards, and the like.

DETAILED DESCRIPTION OF THE INVENTION

The present invention relates to flexible, halogen-free thermoplastic polymer blends which are useful in making sheets, coated fabrics and injection molded parts. These end-products have characteristics similar to those made from polyvinyl chloride (PVC) containing blends, and in addition, demonstrate improved flexibility at low temperatures, and are free from halogen.

Certain terms mentioned below are to be understood to have the meanings indicated; otherwise, terms used in this application should be attributed the meanings understood in the art.

Unless otherwise stated, percentage weight ranges for each of the components in the composition of the present invention are calculated exclusive of any additives which may be present.

The EVACO terpolymer (component (1)(a)) useful in this invention preferably contains 30–90% by weight of ethylene, 10–70% by weight of vinyl acetate and 1–20% by weight of carbon monoxide, more preferably 55–65% by weight of ethylene and 20–30% by weight of vinyl acetate and 5–15% by weight carbon monoxide. In general, EVACO used in the present invention will have a melt flow index (MFI) in the range of 1–50 g/10 min., preferably in the range of 10–40 g/10 min. as determined by ASTM D-1238 (measured at 2,16 kg and 190° C.). EVACO is well known in the art, and commercially available under the name Elvaloy® from the DuPont Company.

Acrylonitrile butadiene rubbers and acrylate acrylonitrile styrene rubbers (components (1)(b) and (1)(c)) are well known in the art. Suitable grades are available under the names CHEMIGUM and SUNIGUM from the Goodyear Tire and Rubber Company.

The EnBACO terpolymer (component (1)(d)) useful in this invention preferably contains 30–90% by weight of ethylene, 10–70% by weight of n-butylacrylate and 1–20% by weight of carbon monoxide, more preferably 55–65% by weight of ethylene and 25–35% by weight of n-butylacrylate and 5–15% by weight carbon monoxide. In general, EnBACO used in the present invention will have a melt flow index (MFI) in the range of 1–50 g/10 min., preferably in the range of 5–30 g/10 min. as determined by ASTM D-1238 (measured at 2,16 kg and 190° C.). EnBACO is well known in the art, and commercially available under the name Elvaloy® from the DuPont Company.

Component (1) preferably comprises 5–65% by weight of the composition of the present invention, more preferably 10–50% by weight, still more preferably 20–40% by weight.

The EVA copolymer (component (2)) useful in this invention preferably contains 30–90% by weight of ethylene and 10–70% by weight of vinyl acetate, more preferably 55–75 % by weight of ethylene and 15–30 % by weight of vinyl acetate. In general, the EVA used in the present invention has a melt flow index (MFI) in the range of 0.05–100 g10 min., preferably less than 50 g/10 min. as determined by ASTM D-1238 (measured at 2,16 kg and 190° C.) and is commercially available under the name Elvax® from the DuPont Company.

Component (2) preferably comprises 5–65% by weight of the composition of the present invention, more preferably 20–50% by weight, still more preferably 20–30% by weight.

The LLDPE (linear low density polyethylene), LDPE (low density polyethylene), HDPE (high density polyethylene), PP (polypropylene) homopolymer and E-PP (ethylene-propylene) copolymer (component (3)) are well known in the art and commercially available. These polyolefins can be produced through conventional polymerization processes, or through the more recently developed single-site catalyst technology. Single-site catalyst technology is described in numerous publications, including U.S. Pat. Nos. 5,272,236 and 5,278,272 and PCT Publication WO 94/06857, and is particularly suitable for the production of LLDPE.

LLDPE is used herein to mean linear low density polyethylene having a specific gravity greater than 0.925 g/cc, and includes copolymers of ethylene and other alphaolefins such as 1-butene, 1-hexene, and 1-octene. LDPE is used herein to mean low density polyethylene having a specific gravity greater than 0.920. It is believed all available grades of HDPE, PP and E-PP copolymer can be used in the blends of the present invention.

Component (3) preferably comprises 5–65% by weight of the composition of the present invention, more preferably 10–50% by weight, still more preferably 20–40% by weight.

In addition to its polymer components, the composition of the present invention can be blended with common additives such as reinforcing and non-reinforcing fillers, flame retardant fillers such as aluminium trihydrate, antioxidants, UV stabilizers, lubricants (e.g., oleamide), antiblocking agents, antistatic agents, waxes, coupling agents for fillers, pigments, titanium dioxide, talc and other processing aids (e.g., zinc stearate) known in the polymer compounding art. These additives may comprise up to about 70 weight percent of the total composition based on polymer components plus additives (the polymer components being present in amounts with respect to each other in the proportions previously specified). The precise amount of additive to be used will depend upon the type of additive, end-use, etc.

The blends of the invention can be prepared by mixing the polymeric ingredients and optional additives by use of conventional masticating equipment, for example, a rubber mill, Brabender Mixer, Banbury Mixer, Buss-ko kneader, Farrel continuous mixer or twin screw continuous mixer. Mixing times should be sufficient to obtain homogeneous blends. Satisfactory mixing times depend upon the types of polymers and upon the type of mixing equipment used. Typically, mixing times of about 1 to 5 minutes are satisfactory. If the polymer blend is obviously non-homogeneous, additional mixing is required.

The invention can be further understood by the following examples in which percentages are by weight and temperatures are in degrees Celsius.

EXAMPLES

Legend

MFI=melt flow index

EVACO=ethylene vinyl acetate carbon monoxide

NBR=acrylonitrile butadiene rubber

ANSR=acrylate acrylonitrile styrene rubber

EVA=ethylene vinyl acetate

VLDPE=very low density polyethylene

LLDPE=linear low density polyethylene

HDPE=high density polyethylene

LDPE=low density polyethylene

E-PP=ethylene propylene copolymer

PP=polypropylene homopolymer

Procedure

A blend is prepared by melt-compounding the following components in the proportions set forth in Table 1 below.

EVACO (79.5% ethylene, 20.5% vinyl acetate and 8% carbon monoxide) having a MFl ($190°/2.16$ kg) of 15

NBR

ANSR having a specific gravity of 1.04 g/cc and a Mooney viscosity (ML1+4/100°) of 44

$EVA_1$ (60% ethylene and 40% vinyl acetate) having a MFI ($190°/2.16$ kg) of 3.0

$EVA_2$ (75% ethylene and 25% vinyl acetate) having a MFI ($190°/2.16$ kg) of 2.0

$EVA_3$ (82% ethylene and 18% vinyl acetate) having a MFI ($190°/2.16$ kg) of 0.7

VLDPE having a specific gravity of 0.900 and a MFI ($190°/2.16$ kg) of 1.0

LLDPE having a specific gravity of 0.930 g/cc and a MFI ($190°/2.16$ kg) of 1.0

HDPE having a specific gravity of 0.958 g/cc and a MFI ($190°/2.16$ kg) of 1.2

LDPE having a specific gravity of 0.922 g/cc and a MFI ($190°/2.16$ kg) of 0.85

E-PP having a specific gravity of 0.906 g/cc and a MFI ($230°/2.16$ kg) of 1.0

PP having a specific gravity of 0.910 g/cc and a MFI ($190°/2.16$ kg) of 1.5

UV stabilizers (blend of 50% by weight T 622 LD (an oligomeric, sterically hindered amine stabilizer available from Ciba; and 50% by weight TINUVIN 328 (a benzotriazole type stabilizer available from Ciba))

antioxidant-phenolic type available under the name IRGANOX 1010 from Ciba

Zinc stearate

Melt compounding is carried out on a two roll mill with batches from 100 grams at 170–190° C. for ca. 5 minutes. The milled product is formed into a testing plaque in a hydraulic press at 170–190° C. for 5 minutes. Afterwards stress-strain testing (ASTM D-638) and Heat Deformation at 85, 105, 115 and 145 deg.C (a 30 gr weight is hanged to a plate sample having a thickness of 0.5 mm, a length of 10 cm and a width of 10 mm) are carried out. Results are shown in Table 1.

TABLE 1

| Example numbers | PA* | 2 | 3 | 4 | 5 | 6 | 7 | 8 |
|---|---|---|---|---|---|---|---|---|
| EVACO | 30 | 30 | 30 | 30 | 30 | 30 | — | — |
| NBR | — | — | — | — | — | — | 30 | — |
| ANSR | — | — | — | — | — | — | — | 30 |
| EVA1 | 4.9 | 4.9 | 4.9 | 4.9 | 4.9 | 4.9 | 4.9 | 4.9 |
| EVA2 | 16 | 16 | 16 | 16 | 16 | 16 | 16 | 16 |
| EVA3 | 16 | 16 | 16 | 16 | 16 | 16 | 16 | 16 |
| VLDPE | 30 | — | — | — | — | — | 30 | 30 |
| LLDPE | — | 30 | — | — | — | — | — | — |
| HDPE | — | — | 30 | — | — | — | — | — |
| LDPE | — | — | — | 30 | — | — | — | — |
| E-PP | — | — | — | — | 30 | — | — | — |
| PP | — | — | — | — | — | 30 | — | — |
| UV stabilizer | 0.6 | 0.6 | 0.6 | 0.6 | 0.6 | 0.6 | 0.6 | 0.6 |
| Antioxidant | 0.5 | 0.5 | 0.5 | 0.5 | 0.5 | 0.5 | 0.5 | 0.5 |
| Zinc stearate | 2 | 2 | 2 | 2 | 2 | 2 | 2 | 2 |
| Tensile strength (MPa) | 20.1 | 24.7 | 16.5 | 16.0 | 15.6 | 9.0 | 10.8 | 11.1 |
| Tensile elongation (%) | 764 | 862 | 719 | 718 | 839 | 326 | 580 | 602 |
| Heat def. at 85° C. (%) | 0 | 0 | 0 | 0 | 0 | 0 | 0 | 0 |
| Heat def. at 105° C. (%) | 20 | 20 | 0 | 0 | 10 | 0 | X | X |
| Heat def. at 115° C. (%) | X | 50 | 0 | X | 40 | 0 | — | — |
| Heat def. at 145° C. (%) | — | — | — | — | — | 0 | — | — |

*prior art
X - sample breaks

One can see that the formulations containing ULDPE, HDPE, E-PP or PP show particularly lower heat deformation values. For automotive products, this being a significant benefit.

Moreover, one can see that the use of NBR or ANSR in place of EVACO give good tensile properties although their heat deformation results are below some of the other formulations.

What is claimed is:

1. A flexible, halogen-free polymer composition comprising a blend of
   (1) a polar rubber selected from the group consisting of (a) ethylene vinyl acetate carbon monoxide terpolymer containing 30–90% by weight ethylene, 10–70% by weight vinyl acetate and 1–20% by weight carbon monoxide, and (b) ethylene n-butylacrylate carbon monoxide terpolymer containing 30–90% by weight ethylene, 10–70% by weight n-butylacrylate and 1–20% by weight carbon monoxide;
   (2) ethylene vinyl acetate consisting of 30–90% by weight ethylene and 10–70% by weight vinyl acetate, and
   (3) a polyolefin selected from the group consisting of (a) a linear low density polyethylene having a specific gravity greater than 0.925, (b) low density polyethylene having a specific gravity greater than 0.920, (c) high density polyethylene, (d) polypropylene homopolymer and (e) ethylene-propylene copolymer.

2. A blend according to claim 1 wherein component (1) comprises 5–65% by weight of the blend, component (2) comprises 5–65% by weight of the blend, and component (3) comprises 5–65% by weight of the blend.

3. A blend according to claim 1 wherein component (1) comprises 20–50% by weight of the blend, component (2) comprises 20–50% by weight of the blend and component (3) comprises 20–50% by weight of the blend.

4. A shaped article formed from a blend according to claim 1.

* * * * *